(No Model.) H. HAEFNER. 2 Sheets—Sheet 1.
FILTER.

No. 399,260. Patented Mar. 12, 1889.

WITNESSES,
Wm. A. Lowe
Wm. Wagner

INVENTOR:
H. Haefner
by his attorneys
Roeder & Briesen (No Model.) 2 Sheets—Sheet 2.
H. HAEFNER.
FILTER.
No. 399,260. Patented Mar. 12, 1889.
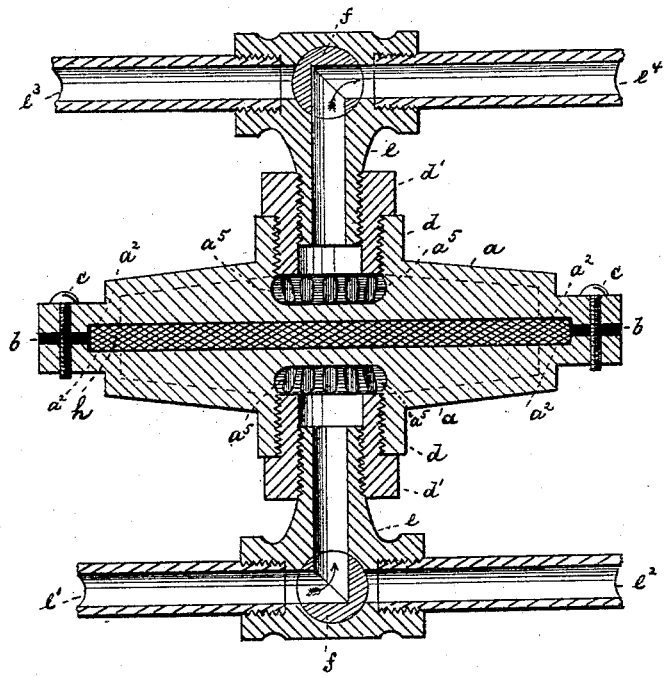
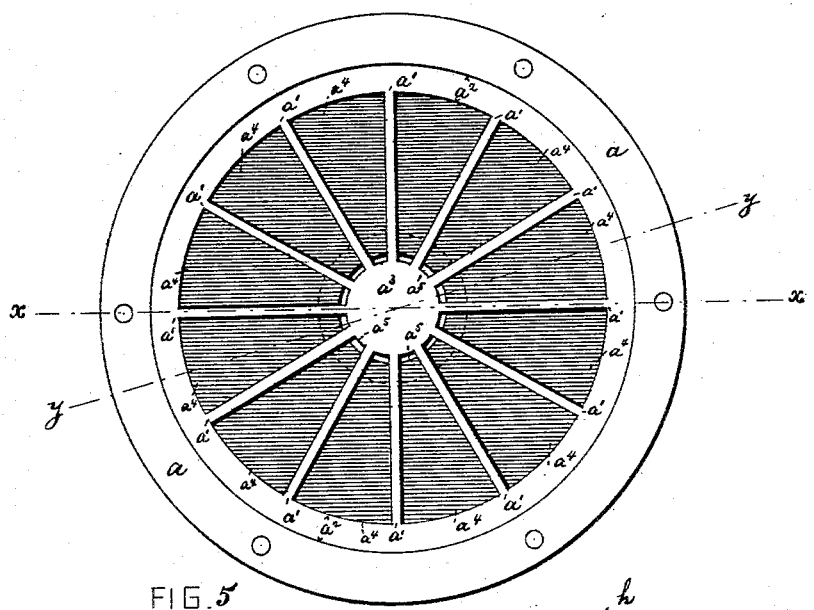
WITNESSES. INVENTOR

UNITED STATES PATENT OFFICE.

HUGO HAEFNER, OF LINDEN, ASSIGNOR TO OHL & HAEFNER, OF NEWARK, NEW JERSEY.

FILTER.

SPECIFICATION forming part of Letters Patent No. 399,260, dated March 12, 1889.

Application filed January 2, 1889. Serial No. 295,207. (No model.)

*To all whom it may concern:*

Be it known that I, HUGO HAEFNER, of Linden, Union county, New Jersey, have invented an Improved Filter, of which the following is a specification.

This invention relates to a filter for water and other liquids which is so constructed that the liquid is divided into a spray, and is thus thrown against the percolating-disk.

The invention consists in the various features of improvement more fully pointed out in the claims.

Figure 1:
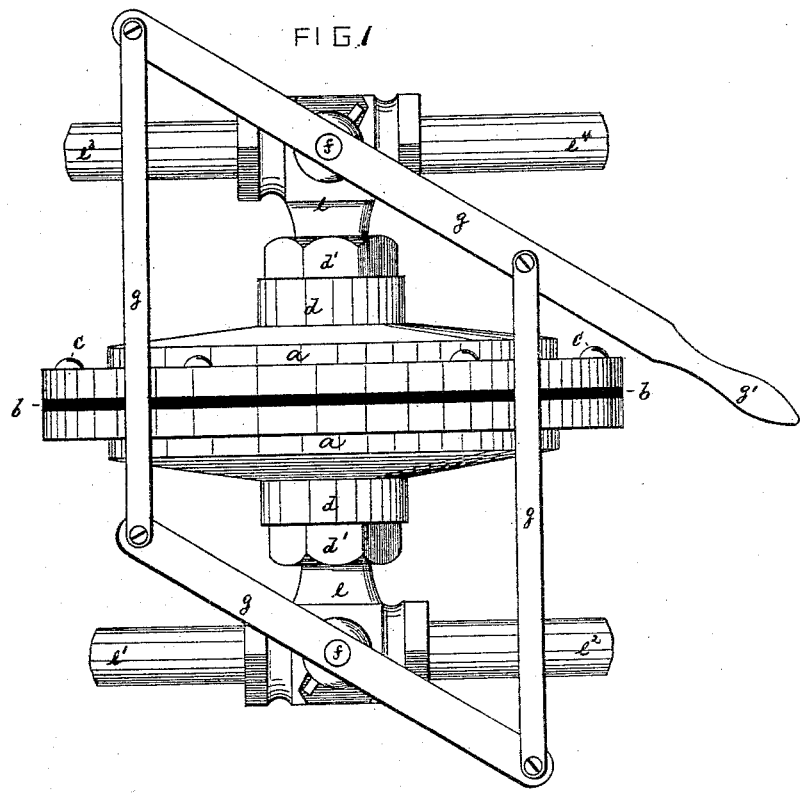
Figure 2:
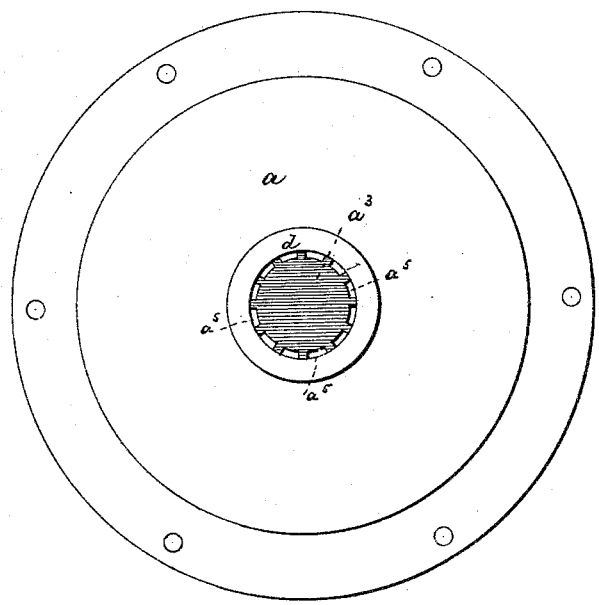

In the accompanying drawings, Figure 1 is a side view of my improved filter. Fig. 2 is an outer view of one of the disks $a$. Fig. 3 is a longitudinal central section of the filter on line $x\,x$, Fig. 4. Fig. 4 is an inner view of one of the disks $a$. Fig. 5 is a cross-section on line $y\,y$, Fig. 4.

The letters $a\,a$ represent a pair of disks, between the rims of which a washer, $b$, is interposed, and which are clamped together by binding-screws $c$. Each of the disks $a$ has an outwardly-projecting screw-threaded socket, $d$, that receives a nut, $d'$, holding a two-way cock, $e$. The plugs $f$ of these cocks are united by a pivoted frame, $g\,g$, having handle $g'$, by means of which both cocks may be simultaneously operated.

The disks $a$ are centrally perforated within their sockets for the ingress and egress of the liquid. At its inner side the body of each disk is partially cut away, so as to leave a series of radiating ribs, $a'$. These ribs join at their outer ends an annular offset, $a^2$, of the disk. At their inner ends they join a small disk, $a^3$, placed across the central opening. It will thus be seen that the inner face of each disk is subdivided into a series of sector-shaped cavities, $a^4$. Each of these cavities communicates with the central opening of the disk by a small lateral perforation, $a^5$.

$h$ is a sheet of felt or other percolator clamped between the disks $a\,a$. This percolator, fitted upon offsets $a^2$, will be held between the ribs $a'$ of the disks, and thus those parts of the percolator which extend across the cavities $a^4$ will be free to the access of the liquid to be filtered.

One of the cocks $e$ connects at $e'$ with the water-supply and at $e^2$ with the waste. The other cock $e$ connects at $e^3$ also with the water-supply and at $e^4$ with the house-service.

The operation of the device is as follows: One turn of handle $g'$ will open the inlet-port $e'$ and the service-supply port $e^4$, and will close the ports $e^2\,e^3$. In this position the water will pass through the central opening of one disk, $a$, (lowermost disk, Fig. 3,) and strike its inner central small disk, $a^3$. This will deflect the water, and will cause it to rush through the lateral perforations $a^5$ into the cavities $a^4$. Thus the water is spread across the entire surface of the percolator $h$. After having passed through the percolator the filtered water will collect in the cavities $a^4$ of the opposite disk, and, passing through the lateral perforations $a^5$ and the cock, will be conducted to the service-port $e^4$. Of course sediment will in time settle upon the face of the percolator which is opposite the inlet-port $e'$. To wash this sediment off, the plugs $f$ are turned to open ports $e^3\,e^2$ and close ports $e'\,e^4$. The course of the water will now be reversed, and the water will wash the sediment into the waste-pipe.

What I claim is—

1. The combination of disks $a$, having ribs $a'$ and cavities $a^4$ on their inner face, with an interposed percolator, $h$, and with inlet and discharge pipes connected to the disks, substantially as specified.

2. The combination of disks $a$, having radial ribs $a'$ and cavities $a^4$ on their inner face, with the disks $a^3$, placed back of the inlet and discharge openings of the disks $a$, and with perforations $a^5$, connecting such openings with the cavities $a^4$ and with percolator $h$, and with inlet and discharge pipes, substantially as specified.

3. The combination of disks $a$, having disks $a^3$, ribs $a'$, perforations $a^5$, and sockets $d$, with cocks $e$, received by said sockets and having plugs $f$, and with the pivoted frame $g\,g$, engaging said plugs, and with the percolator $h$, washer $b$, and binding-screws $c$, substantially as specified.

HUGO HAEFNER.

Witnesses:
F. V. BRIESEN,
HENRY E. ROEDER.